United States Patent [19]

Perry et al.

[11] Patent Number: 5,214,127
[45] Date of Patent: May 25, 1993

[54] PREPARATION OF POLYAMIDES FROM CARBON MONOXIDE AND AROMATIC IODO AMINE

[75] Inventors: Robert J. Perry; S. Richard Turner, both of Pittsford; Richard W. Blevins, Rochester, all of N.Y.

[73] Assignee: Eastman Kodak Company, Rochester, N.Y.

[21] Appl. No.: 841,887

[22] Filed: Feb. 25, 1992

Related U.S. Application Data

[60] Continuation-in-part of Ser. No. 810,612, Dec. 19, 1991, abandoned, which is a division of Ser. No. 531,814, Jun. 1, 1990, Pat. No. 5,104,971.

[51] Int. Cl.$^5$ .............................................. C08G 69/00
[52] U.S. Cl. ...................................... 528/422; 528/210; 528/220; 528/222; 528/225; 528/310; 528/348
[58] Field of Search ............... 528/422, 210, 220, 222, 528/225, 348, 310

[56] References Cited

U.S. PATENT DOCUMENTS

| | | | |
|---|---|---|---|
| 3,448,140 | 6/1969 | Gamlen et al. | 528/422 |
| 4,134,880 | 1/1979 | Miyata et al. | 528/422 |
| 4,801,744 | 1/1989 | Herman et al. | 528/422 |
| 5,104,971 | 4/1992 | Perry et al. | 528/422 |

FOREIGN PATENT DOCUMENTS 123823  11/1987  Japan ....................................... 69/32

OTHER PUBLICATIONS

Y Voneyama et al, "Novel Synthesis of Aromatic Polyamides by Palladium-Catalyzed Polycondensation of Aromatic Dibromides, Aromatic Diamines, and Carbon Monoxide," *Macromolecules,* 1988, 21, 1908-1911.

*Primary Examiner*—Harold D. Anderson
*Attorney, Agent, or Firm*—Robert Luke Walker

[57] ABSTRACT

A process for the preparation of aromatic polyamides comprises reacting carbon monoxide and an aromatic iodoamine characterized by having at least one iodine atom covalently bonded to an aromatic ring and at least one amino group. The process is conducted in the presence of a solvent, a catalyst and a base at a pressure greater than about 1 kg/cm$^2$.

10 Claims, 1 Drawing Sheet

PREPARATION OF POLYAMIDES FROM CARBON MONOXIDE AND AROMATIC IODO AMINE

This is a continuation-in-part of application Ser. No. 810,612, filed Dec. 19, 1991, now abandoned, which is divisional of application Ser. No. 531,814, filed Jun. 1, 1990, now U.S. Pat. No. 5,104,971.

FIELD OF THE INVENTION

This invention relates to a process for the preparation of aromatic polyamides.

BACKGROUND OF THE INVENTION

Aromatic polyamides have been prepared by condensing aromatic diacid chlorides and aromatic diamines in polar aprotic solvents. In practice, the variety of aromatic polyamides which can be prepared by this process is limited by the small number of commercially available diacid chlorides. It would be desirable to provide a process capable of producing a wider variety of aromatic polyamides.

Japanese Kokai 123823, published May 16, 1989, discloses a method for the production of aromatic polyamides by reacting an aromatic diamine, an aromatic dibromide and CO in the presence of palladium catalyst in an organic solvent at atmospheric pressure. This method produces low molecular weight aromatic polyamides having inherent viscosities in the range from about 0.2 to about 0.8 dL/g. However, as indicated by Yang in "Aromatic High Strength Fibers", Wiley, New York, 1989, it is known that polyamides having particularly useful mechanical properties exhibit inherent viscosities greater than 1.0 dL/g. Additionally, the method described in Japanese Kokai 123823 is undesirably slow. Thus, it would be desirable to prepare aromatic polyamides having higher molecular weights and higher inherent viscosities at faster rates of formation.

SUMMARY OF THE INVENTION

We have discovered a method for preparing a wide variety of aromatic polyamides having high molecular weights and high inherent viscosities at rapid rates of formation.

More specifically, in accordance with this invention, there is provided a process for the preparation of aromatic polyamides comprising reacting CO, a diamine and an aromatic, non-ortho polyiodide, the process being conducted in the presence of a solvent, a catalyst and a base at a pressure greater than about 15 psia (1.05 kg/cm$^2$).

In another aspect of this invention, there is provided a process for the preparation of aromatic polyamides comprising reacting CO and an aromatic iodoamine in the presence of a solvent, a catalyst and a base at a pressure greater than about 15 psia (1.05 kg/cm$^2$).

It is an advantageous feature of this invention that a method is provided for preparing aromatic polyamides having high molecular weight and high inherent viscosity.

It is another advantageous feature of this invention that a wide variety of such aromatic polyamides can be produced at high rates.

Other advantageous features of this invention will become readily apparent when the following detailed description is read in light of the accompanying Figure.

BRIEF DESCRIPTION OF THE DRAWING

The sole Figure is a plot of the growth in molecular weight as a function of time for aromatic polyamides prepared from an aromatic diiodide and an aromatic diamine in accordance with this invention compared to polyamides prepared from an aromatic dibromide and diamine at 15, 35 and 105 psia (1.05, 2.46 and 7.38 kg/cm$^2$).

DESCRIPTION OF THE PREFERRED EMBODIMENTS

Figure 1:
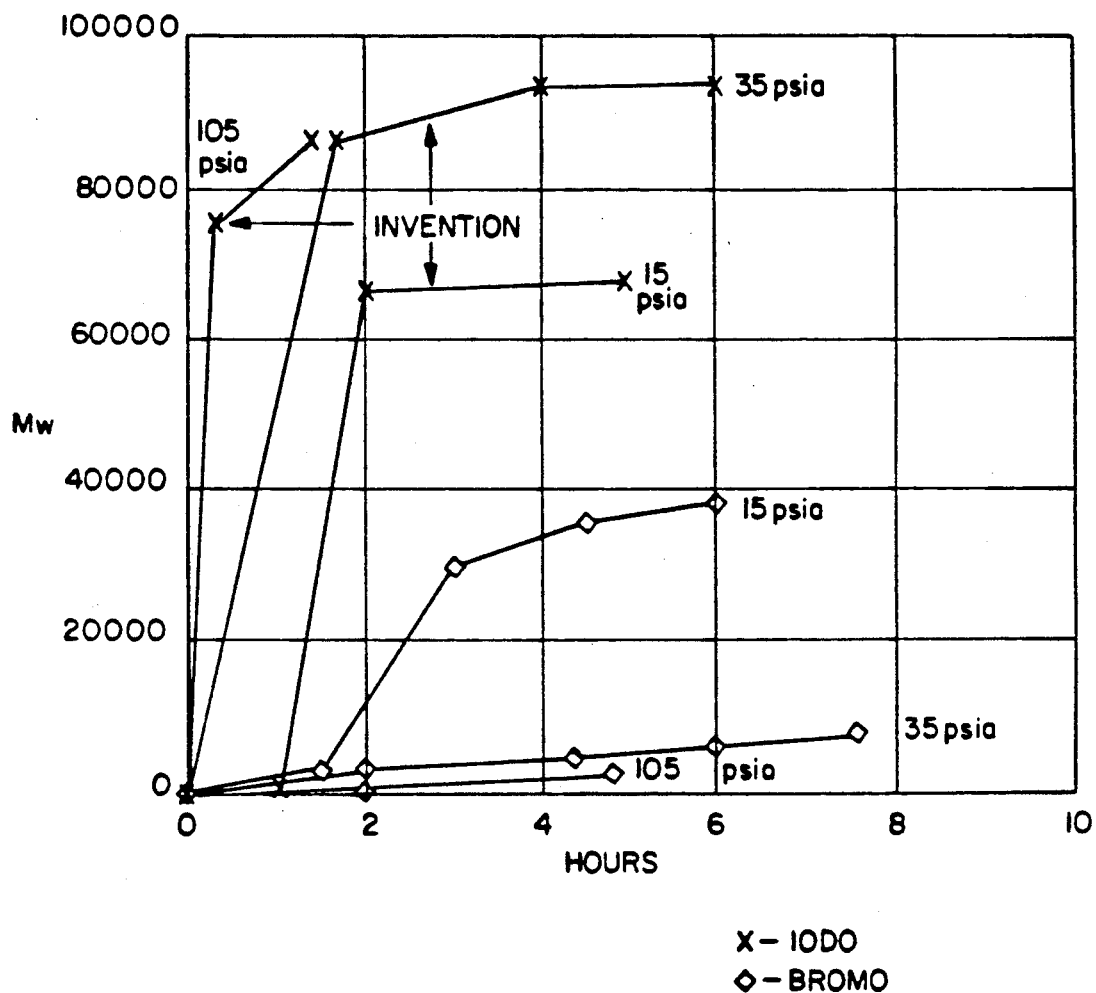

This invention is based partly on the discovery that aryldiiodides, when reacted with diamines in the presence of pressurized CO, result in remarkably faster polyaramide formation rates and higher molecular weight polyamides than do aryldibromides.

As stated above, the process of this invention comprises reacting CO, a diamine and an aromatic polyiodide. The diamine reactants useful herein include both aliphatic and aromatic diamines. The diamine preferably is an alkyl or aromatic diamine. It can contain primary and/or secondary amine derivatives of a fused or bridged ring system. There may be two or more primary amino groups substituted on a benzenoid nucleus or a bridged ring system.

Aliphatic primary diamines can be used in the process of this invention. They may be saturated or unsaturated. They also may comprise one or more non-aryl rings or be acyclic. Preferably, the aliphatic diamines are primary or secondary alkyl diamines wherein the alkyl group or groups have up to about 10 carbon atoms. The alkyl groups can be branched or unbranched. Preferably, the diamines are liquids or solids that are soluble or dispersible in the reaction mixture.

Compounds having two or more primary amino groups within the molecule are illustrated by the following compounds:

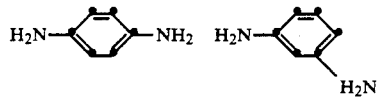

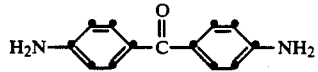

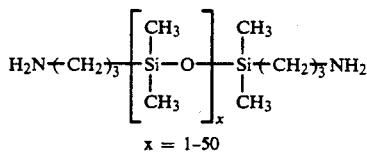

x = 1-50

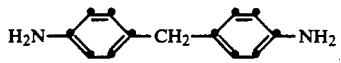

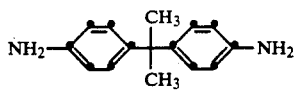

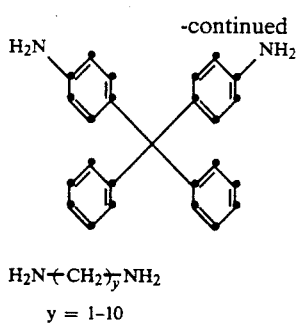

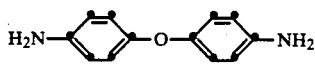

y = 1–10

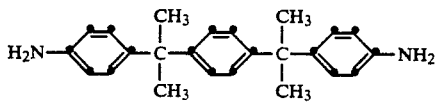

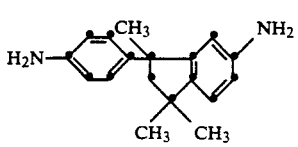

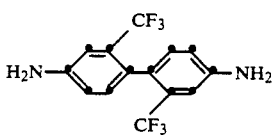

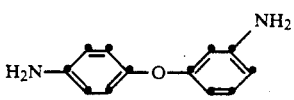

The process of this invention comprises reacting CO, a diamine as described above and at least one aromatic diiodide. The diiodide is an aromatic compound having at least two iodo radicals bonded to an aromatic nucleus in non-ortho positions. The reason for this is that aromatic orthodiiodes do not produce high yields of aromatic polyamides. Rather, they cyclize to form phthalimides. The iodines can be bonded to the same or different aromatic rings in the molecules. Compounds having two iodine atoms are preferred, but aromatic compounds having three or more iodine atoms are also useful. For example, triiodoaromatics can be used.

The process of this invention is not limited to any particular aromatic system. The invention is useful in conjunction with any polyiodoaromatic which reacts under the reaction conditions employed to form an aromatic polyamide. Preferably, the polyiodoaromatic is sufficiently stable under the reaction conditions employed to prevent the formation of an unacceptable amount of by-product. It is preferred that the polyiodoaromatics be free of groups which unduly retard the reaction by steric hinderance or by lowering the activity of the catalyst.

Suitable aromatic compounds include hydrocarbon aromatics, nitrogen-containing aromatics, sulfur-containing aromatics and oxygen-containing aromatics such as dibenzofuran. Typical hydrocarbon aromatics include benzene and biphenyl, and condensed ring aromatics such as naphthalene and anthracene. Sulfur-containing aromatics include thiophene and benzothiophene. Nitrogen-containing aromatics include pyridine and benzopyridine. The iodo substituents can be bonded to substituted or unsubstituted aromatics. Substituted aromatics are exemplified by such compounds as aryl sulfones, diaryl ethers, diaryl carbonyls, diaryl sulfides, dialkyl benzenes, dialkoxy benzenes, diaryloxy benzenes and the like.

Of these compounds, m-diiodobenzene, 4,4'-diiododiphenyl ether, 4,4'-diiododiphenyl sulfone, p-diiodobenzene, 4,4'-diiodobiphenyl and 2,6-diiodonaphthalene are preferred.

Alternatively, rather than reacting the CO with a diamine and an aromatic polyiodide as described above, the CO can be reacted with an aromatic iodoamine. In this case, both the iodo and amine functionality are provided on the same aromatic molecule. Aromatic iodoamines useful herein are characterized by having at least one iodine atom covalently bonded to an aromatic ring, such as described above, and contain at least one amino group, such as described above, covalently bonded to the same molecule. The CO can be reacted with the aromatic iodoamine under the reaction conditions described herein.

Exemplary aromatic iodoamines include:

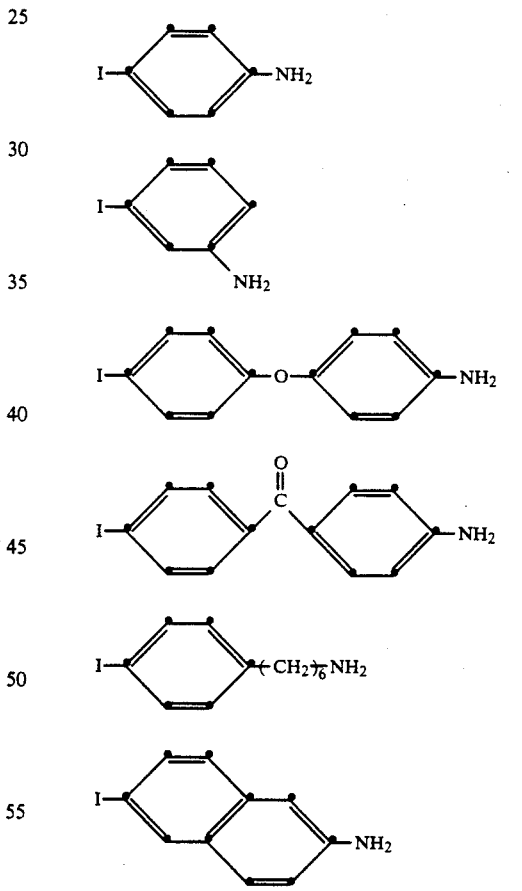

The above-described aromatic polyiodide and diamine compounds are reacted with carbon monoxide at a pressure greater than about 15 psia (1.05 kg/cm$^2$). The CO pressure can be in the range from about 15 psia (1.05 kg/cm$^2$) to about 250 atmospheres (258 kg/cm$^2$) or higher. Pressures of at least about 35 psia (2.46 kg/cm$^2$) are preferred. The reason for this is that higher molecular weight polymers have been prepared and faster formation rates observed at pressures greater than about 35 psia (2.46 kg/cm$^2$). One can readily adjust the CO pressure by pressurizing the reaction vessel with CO to the desired reaction pressure. The CO can be diluted with inert gases such as N$_2$ or Ar.

The process proceeds well when the diamine compounds are contacted in approximately stoichiometric amounts. However, it is not necessary to use stoichiometric quantities. An excess of a reactant can be used to drive the reaction toward completion. A convenient amount of excess preferably is used. In other words, one employs an amount of excess which provides the desired result, but which does not unduly hinder the process by adding unacceptable cost, or by complicating the process by making it unduly difficult to separate product from unreacted materials. When one of the organic reactants is used in excess, it is preferably used in an amount of from 1.001 to about 5 times the molar amount dictated by stoichiometry.

The process of this invention is conducted in the presence of a solvent. A wide variety of organic compounds can be used so long as the reaction medium is "inert", i.e., so long as the medium does not enter into the reaction in an undesired way. The solvent preferably dissolves one or both organic reactants to an appreciable extent. An ether solvent can be used. Exemplary ether solvents include tetrahydrofuran, diglyme (2-methoxyethyl ether), and glyme (1,2-dimethoxyethane). A dipolar aprotic solvent is preferentially employed. Such solvents are characterized by the absence of acidic, easily abstractable hydrogens and by being a highly polar molecule. Exemplary dipolar aprotic solvents include dimethylformamide, dimethylacetamide, dimethylsulfoxide, hexamethylphosphoramide, N-methylpyrrolidinone and the like. Still other suitable solvents include hydrocarbon solvents such as toluene.

The amount of solvent present is not critical to the reaction. However, one typically uses enough solvent to facilitate the reaction. Specific polymers may have optimum concentrations in various solvents. There is no theoretical upper limit on the amount of solvent employed. However, practical limits are imposed by the size of the reaction vessel, the ease of separation of product(s) from the reaction medium, process cost, etc. Generally, the amount of solvent used is within the range of from about 0.1 to about 1000 volumes based on the volume of aromatic polyiodide employed. Advantageously, the reaction medium can be agitated, for example, by stirring to facilitate the adsorption of gaseous CO.

The process of the invention is carried out in the presence of a catalyst. The catalyst is preferentially a palladium compound, where palladium is present in the zero valent or divalent state. However, other transition metal catalysts, e.g., platinum and nickel catalysts can be used. The palladium catalysts generally have one or more ligands bonded to one or more palladium atoms by ionic or covalent bonds. Simple palladium salts such as PdX$_2$ wherein X is Cl, Br or I can be used. Other representative palladium catalysts are listed below.

TABLE I

| Palladium Catalysts | |
|---|---|
| Pd$^{+2}$ | |
| PdX$_2$L$_2$ | X = Cl, Br, I |
| | L = R$_3$P, where R = alkyl or aryl |
| Pd(OAc)$_2$ | OAc = acetate |
| Pd(OAc)$_2$L$_2$ | OAc = acetate |
| PdCl$_2$(RCN)$_2$ | R = CH$_3$, Phenyl |
| PhPdXL$_2$ | X = Br, I |

TABLE I-continued

| Palladium Catalysts | |
|---|---|
| PdCl$_2$(COD)$_2$ | COD = cis, cis-1,5-cyclooctadiene |
| Pd(acac)$_2$ | acac = 2,4-pentanedionate |
| Pd$^{(o)}$ | |
| PdL$_4$ | |
| L = R$_3$P where R = alkyl or aryl | |

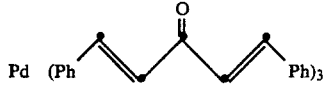

A catalytic amount of catalyst is employed. By "catalytic amount" is meant an amount of catalyst which catalyzes the reaction to the desired extent. Generally, the amount of catalyst is at least about 0.002 mole percent based on the amount of aromatic iodide. There is no real upper limit on the amount of catalyst, this being defined by secondary considerations such as cost and ease of separation of the catalyst from products and unreacted reactants. A preferred catalytic amount is from about 0.005 to about 0.20 moles per mole of aryl iodide, more preferably from about 0.03 to about 0.10 mole per mole of aromatic iodide reactant.

The process of this invention is preferably conducted in the presence of a base to neutralize by-product hydrogen iodide. The base may be a tertiary amine such as tributylamine, pyridine, 1,8-diazobicyclo[5,4,0]-7-undecene (DBU) or have the formula:

NR$_3$ wherein each R is independently selected from lower alkyl groups having from about 2 to about 6 carbon atoms. The base may be immobilized on a cross-linked polymer such as cross-linked poly(vinylpyridine) beads. Alternatively, the base may be another type of basic substance which does not react with the reactants, e.g., a metal carbonate such as K$_2$CO$_3$ or a metal hydroxide such as Ca(OH)$_2$ or a metal acetate such as sodium acetate. Generally, one employs at least enough base to react with the by-product HI produced. An excess can be used, if desired.

As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other materials can be substituted in this invention to achieve similar results.

The process of this invention is preferably conducted at a temperature within the range of from about room temperature, i.e., about 20° C., to about 250° C. A preferred temperature range is from about 70° C. to about 150° C. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used. However, it is a particularly advantageous feature of this invention that high molecular weight aromatic polyamides can be prepared in less than about 5 hours, and in some instances, in less than about 2 hours.

In preferred embodiments, a salt can be added to the reaction medium. The salt imparts solubility to the aromatic polyamide, presumably by breaking up hydrogen bonding on the polymer chains. It is desirable to keep the polyamide in solution from the standpoint of process efficiency. Suitable salts include salts of lithium such as LiCl, LiBr and $CaCl_2$.

The reaction can take place in the presence of an activating ligand, such as a phosphine or arsine ligand. The presence of the activating ligand speeds up the oxidative addition of the catalyst to the aromatic polyiodide by making the catalyst more nucleophilic. The activating ligand can be present in an amount of 0.01 mole to 5.0 moles per mole of metal catalyst.

According to this invention, aromatic polyamides have been readily prepared having inherent viscosities above 0.8 dL/g. An advantageous feature of this invention is that aromatic polyamides can be prepared having inherent viscosities above 1.0 dL/g.

Japanese Kokai 123823, cited above, indicates that an aromatic diiodide could be used in place of an aromatic dibromide but that the use of such aromatic diiodide is economically unwise. However, there is no suggestion of Applicants' process which takes place at pressures greater than 15 psia (1.05 kg/cm$^2$) and involves the use of aromatic polyiodides, nor of the remarkably superior formation rates of aromatic polyamides having higher molecular weights and higher inherent viscosities.

While not wishing to be bound by theoretical mechanisms, it is believed that the advantages of this invention result from the effects of the following proposed reaction mechanism sequence which includes an oxidative addition step, a CO insertion step and a coupling step as illustrated below:

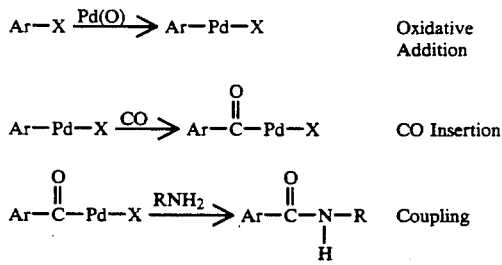

When X=Br under one atmosphere of CO, oxidative addition is slower than CO insertion. However, if CO pressures are increased, a greater number of CO molecules are coordinated to the Pd(O) species rendering it less nucleophilic and therefore, less susceptible to oxidative addition. This results in much slower overall reaction rates for the formation of aramids from arylbromides. For aromatic iodides, oxidative addition is faster than CO insertion. Thus, when the CO pressure is increased from atmospheric pressure, the less nucleophilic Pd(O) species still oxidatively add to the aryliodides and the CO insertion reaction increases, resulting in an overall increase in the reaction rate.

Aromatic polyamides synthesized in the examples include:

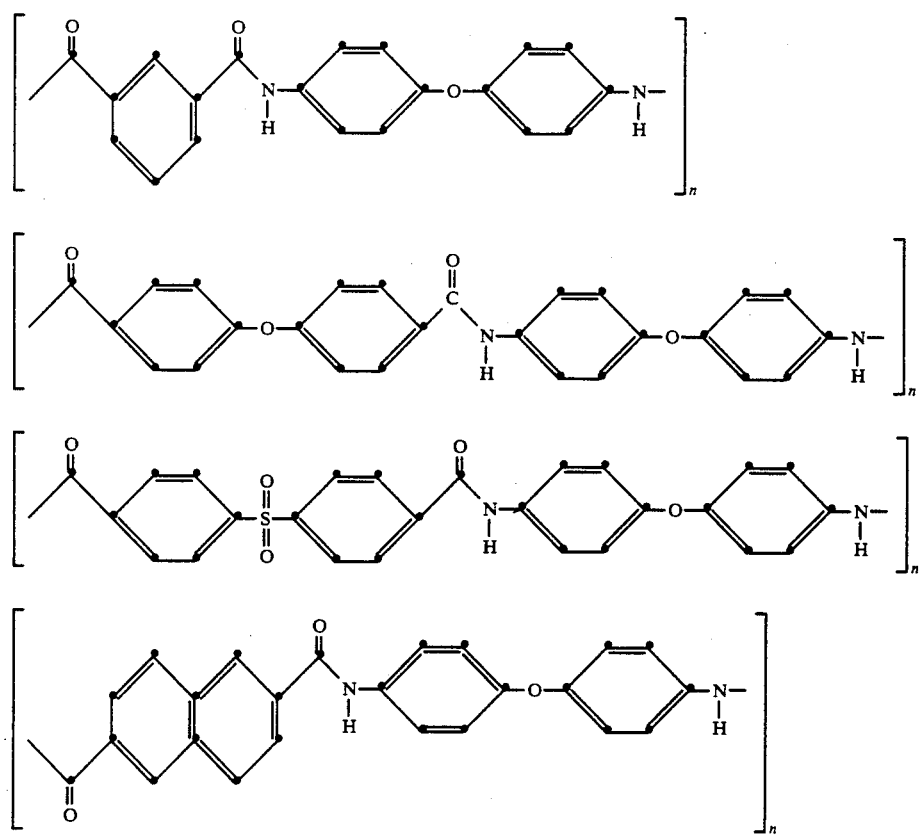

The highest molecular weight polyamides were obtained with a non-stoichiometric ratio of the diamine and diiodo compound. The addition of inorganic salts, such as LiCl, had no detrimental effect on the polymerization reaction nor did the absence of added free triphenylphosphine ligands.

The following examples further illustrate the invention.

EXAMPLE 1

A clean, dry 100 ml pressure vessel was charged with the following reagents under an inert atmosphere in a dry box:

4,4′-diaminodiphenyl ether (ODA)-1.00 g, 5 mmol;
N,N-dimethyl acetamide (DMAc)-15 g;
1,8-diazabicyclo(5.4.0.)undec-7-ene (DBU)-1.83 g, 12 mmol;
triphenylphosphine (Ph3-P)-0.156 g, 0.6 mmol;
bis(triphenylphosphine)palladium (II) chloride-0.21 g, 0.3 mmol; and
meta-diiodobenzene-1.56 g, 4.8 mmol.

The vessel was sealed and removed from the dry box. The vessel was purged four times with high purity carbon monoxide, pressurized to 105 psia (7.38 kg/cm$^2$) with carbon monoxide, and heated with magnetic stirring in an oil bath at 90° C. After 30 minutes, an additional increment of 0.025 g (0.07 mmol) meta-diiodobenzene in 1.75 g D,Ac was added, and the vessel was repurged and recharged with carbon monoxide. The polymerization was continued an additional 30 minutes, an increment of 0.025 g (0.07 mmol) meta-diiodobenzene in 1.75 g DMAc was added, and the vessel was repurged and recharged with carbon monoxide. The polymerization was continued an additional 60 minutes. The polymer solution was diluted with 15 ml DMAc, filtered, and precipitated into methanol. The polymer product was filtered and dried at 110° C. under high vacuum for 48 hours. The yield was 1.65 g, 100% theory. Inherent viscosity in DMAc=1.28. SEC molecular weight average (PMMA equivalent in DMF/LiBr)=208,000.

EXAMPLE 2

Example 1 was repeated except that the amount of DMAc was 20 g and no additional aliquotes of material were added. The polymerization was continued for 90 minutes total. The yield was 1.65 g, 100% theory. Inherent viscosity in DMAc=1.28. SEC molecular weight average (PMMA equivalent in DMF/LiBr)=202,000.

COMPARATIVE EXAMPLE A

Example 2 was repeated, except that 1.12 g, 4.8 mmol of meta-dibromobenzene was substituted for the meta-diiodobenzene. Yield was 0.5 g, 30% theory. Inherent viscosity in DMAc=0.05. SEC molecular weight average (PMMA equivalent in DMF/LiBr)=1740.

EXAMPLE 3

Example 2 was repeated except that the pressure vessel was loaded with the polymerization solution under room atmosphere, then purged as described, and the carbon monoxide pressure was about 1015 psia (71.4 kg/cm$^2$). The reaction time was 90 minutes. Inherent viscosity in DMAc=0.84. SEC molecular weight average (PMMA equivalent in DMF/LiBr)=91600.

COMPARATIVE EXAMPLE B

Example 3 was repeated, except that 1.12 g, 4.8 mmol of meta-dibromobenzene was substituted for the meta-diiodobenzene, the carbon monoxide pressure was 650 psi (45.7 kg/cm$^2$), and the reaction was allowed to continue for 5 hours. No solid product was observed on precipitation into methanol.

EXAMPLE 4

A clean dry 100 ml pressure vessel was charged with the following reagents in a dry box:

4,4′-diaminodiphenyl ether-2.00 g, 10 mmol;
N-methylpyrrolidinone (NMP)-40 g;
1,8-diazabicyclo(5.4.0.)undec-7-ene(DBU)-3.65 g, 24 mmol;
triphenylphosphine (Ph3-P)-0.312 g, 1.2 mmol;
bis(triphenylphosphine)palladium (II) chloride-0.42 g, 0.6 mmol; and
meta-diiodobenzene-3.20 g, 9.7 mmol.

The polymerization solution was prepared as in Example 2. The solution was pressurized to 15 psia using a balloon filled with high purity carbon monoxide. Samples of the reaction solution were removed at timed intervals to monitor the growth in molecular weight. After 5 hours, the SEC molecular weight (PMMA equivalents, in DMF/LiBr) Mw=67200.

COMPARATIVE EXAMPLE C

Example 4 was repeated except that 2.29 g, 9.7 mmol of meta-dibromobenzene was substituted for the meta-diiodobenzene. After 6 hours, the SEC molecular weight (PMMA equivalents, in DMF/LiBr) Mw=37200.

EXAMPLE 5

Example 4 was repeated except that the carbon monoxide pressure was 35 psia. After 24 hours, the SEC molecular weight (PMMA equivalents, in DMF/LiBr) Mw=91100.

COMPARATIVE EXAMPLE D

Example 4 was repeated except that meta-dibromobenzene, 2.29 g 9.7 mmol was substituted for the meta-diiodobenzene. After 24 hours, the SEC molecular weight (PMMA equivalents, in DMF/LiBr) Mw=53200.

EXAMPLE 6

Example 4 was repeated except that the CO pressure was 105 psia (7.38 kg/cm$^2$). After 1.5 hours, the SEC molecular weight (PMMA equivalents, in DMF/LiBr) Mw=87700.

COMPARATIVE EXAMPLE E

Example 6 was repeated, substituting meta-dibromobenzene, 2.29 g, 9.7 mmol for the meta-diiodobenzene. After 24 hours, the SEC molecular weight (PMMA equivalents, in DMF/LiBr) Mw=9360.

EXAMPLE 7

A clean, dry 100 ml pressure vessel was charged with the following reagents under an inert atmosphere in a dry box:

4,4′-diaminodiphenyl ether (ODA)-1.00 g, 5 mmol;
N,N-dimethyl acetamide (DMAc)-20 g;
1,8-diazabicyclo(5.4.0.)undec-7-ene(DBU)-1.83 g, 12 mmol;

bis(triphenylphosphine)palladium(II) chloride-0.21 g 0.3 mmol;

4,4'-diiododiphenyl ether-2.00 g, 4.75 mmol.

The procedure described in Example 2 was followed. The inherent viscosity was measured in DMAc with 5% LiCl=2.38.

EXAMPLE 8

A clean, dry 100 ml pressure vessel was charged with the following reagents under an inert atmosphere in a dry box:

4,4'-diaminodiphenyl ether (ODA)-1.00 g, 5 mmol;
N,N-dimethyl acetamide (DMAc)-20 g;
1,8-diazabicyclo(5.4.0.)undec-7-ene(DBU)-1.83 g, 12 mmol;
bis(triphenylphosphine)palladium(II) chloride-0.21 g 0.3 mmol;
4,4'-diiododiphenyl sulfone-2.23 g, 4.75 mmol;
lithium chloride-0.424 g, 10 mmol.

The procedure described in Example 2 was followed, except that the temperature was 120° C. The inherent viscosity was measured in DMAc with 5% LiCl=1.50.

EXAMPLE 9

The procedure described in Example 8 was followed, except that the temperature was 90° C. and 1.80 g, 4.75 mmol of 2,6-diiodonaphthalene was used in place of the diiodophenyl sulfone. The inherent viscosity was measured in DMAc with 5% LiCl=0.97.

The results of Examples 4–9 and Comparative Examples C–E are depicted graphically in the Figure which contains a systematic representation of the differences between the diiodo and dibromo monomers. A significant difference between the diiodo aromatics and the dibromo aromatics is apparent when a comparison is made between polymers formed from reaction of m-diiodo benzene or m-dibromo benzene and ODA at 15 psia (1.05 kg/cm$^2$) CO. After 2 hours the iodo reaction was complete, producing moderate molecular weight aramid polymer. After 6 hours, the bromo reaction was still continuing, and the polymer was only half as high in molecular weight. When CO pressures greater than 15 psia (1.05 kg/cm$^2$) were applied to the system, the differences between the two classes of compounds were even more pronounced. The Figure shows that after 24 hours, at 35 psia (2.46 kg/cm$^2$) CO, the polyaramid formed from the diiodo compound had twice the molecular weight of that from the dibromo compound. Also, it is important to note that the diiodo reaction had achieved high molecular weight after 4 hours while that of the dibromo had not. If high molecular weight can be achieved using the dibromo compound it would take an unacceptably long time. When the CO pressure was raised to 105 psia (7.38 kg/cm$^2$), the polymerization reaction for the dibromo monomer was almost completely inhibited. The Figure shows that after 5 hours, no polymer formation had taken place. In contrast, the diiodo monomer had achieved high molecular weight in less than 2 hours.

EXAMPLE 10

A pressure reactor was charged with 4-amino-4'-iododiphenylether (1.50 grams, 0.14 mmol), lithium chloride (212 milligrams, 5.01 mmol), bis(triphenylphosphine)palladium(II)dichloride (105 milligrams, 0.15 mmol) and N,N-dimethylacetamide (DMAc) (15.0 milliliters). The mixture was degassed three times then pressurized with carbon monoxide to 0.7 kg/cm$^2$ to (10 psig) and allowed to sit for 1 minute. The pressure was released and 1,8-diazabicyclo(5.4.0)undec-7-ene (900 microliters, 6.02 mmol) was added by syringe. The vessel was pressurized with carbon monoxide to 7.7 kg/cm$^2$ (95 psig) and allowed to react for 4 hours at 115 degrees C. The reaction mixture was then diluted with DMAc (10 milliliters), filtered through a filter aid, concentrated, and precipitated into methanol. The polymer was washed extensively with methanol then air dried, redissolved in DMAc containing lithium chloride and reprecipitated into methanol. The polymer was again washed extensively with methanol then dried in vacuo at 90 degrees C. for 18 hours to give 1.03 grams of polymer at a yield of 98 percent. Infrared spectra were recorded on a Nicolet 5ZDX spectrometer as KBr pellets. Bands were observed at: 1650, 1605, 1540, 1500, 1250, and 1225 cm$^{-1}$.

In order to obtain more reproducible molecular weight measurements, the polymer was reacted with potassium hydroxide in DMSO and then methyliodide to convert some N—H groups to N—CH$_3$ groups. Molecular weight data were obtained with a size exclusion chromatography (SEC) system using coupled low angle laser light scattering, differential viscometry and refractive index detection and having three 8.0 mmm. i.d.×300 mm. HT Linear gel mixed-bed columns and one 30 nm pore-diameter HT columns marketed by Waters, Division of Millipore, Milford, Mass. coupled in series calibrated against universal calibration standards. Size exclusion chromatography data was calibrated against poly(methylmethacrylate) (PMMA) standards to obtain molecular weight determinations, which are referred to herein as "Mn" or "number average molecular weight" and "Mw" or "weight average molecular weight. Molecular weights after conversion of N—H groups to N—CH$_3$ groups was determined to be: (Pairs of numbers represent two determinations of each value)

PMMA equivalent:
$M_w$=46,100; 45,300
$M_n$=26,200; 25,700.

The invention has been described in detail with particular reference to certain preferred embodiments thereof, but it will be understood that variations and modifications can be effected within the spirit and scope of the invention.

What is claimed is:

1. A process for the preparation of an aromatic polyamide, said process comprising reacting carbon monoxide and an aromatic iodoamine having at least one iodine atom covalently bonded to an aromatic ring and at least one amino group; in the presence of solvent, base, and catalyst selected from the group consisting of platinum compounds, palladium compounds, and nickel compounds, at a pressure greater than 15 psia.

2. The process of claim 1 wherein said pressure is at least 35 psia.

3. The process of claim 1 wherein said catalyst is a palladium catalyst.

4. The process of claim 3 wherein said palladium catalyst is selected from the group consisting of PdX$^1$$_2$, PdX$^1$L$_2$, Pd(acetate)$_2$, Pd(acetate)$_2$L$_2$, PdCl$_2$(R$^2$CN)$_2$, PhPdX$^2$L$_2$, PdCl$_2$(cis, cis-1,5-cyclooctadiene)$_2$, Pd(2,4-pentanedionate)$_2$, PdL$_4$, and

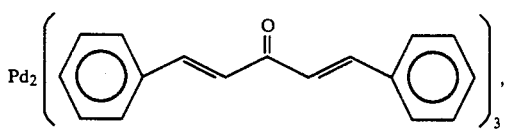

wherein
$X^1$ is Cl, Br, or I,
L is $(R^1)_3P$, and $R^1$ is alkyl or aryl,
$R^2$ is $CH_3$ or phenyl, and
$X^2$ is Br or I.

5. The process of claim 1 wherein said iodoamine is selected from the group consisting of

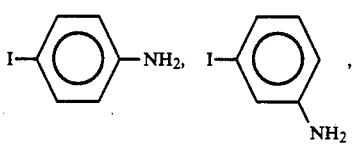

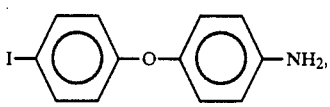

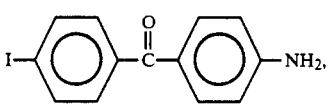

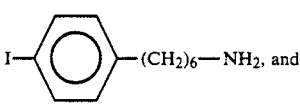

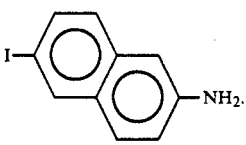

6. A process for the preparation of an aromatic polyamide comprising reacting carbon monoxide and an aromatic iodoamine having at least one iodine atom covalently bonded to an aromatic ring and at least one amino group, in the presence of solvent and catalyst, said catalyst being selected from the group consisting of platinum compounds, palladium compounds, and nickel compounds.

7. The process of claim 6 further comprising neutralizing byproduct hydrogen iodide.

8. The method of claim 7 wherein said catalyst is a palladium compound.

9. The process of claim 8 wherein said palladium catalyst is selected from the group consisting of $PdX^1{}_2$, $PdX^1L_2$, $Pd(acetate)_2$, $Pd(acetate)_2L_2$, $PdCl_2(R^2CN)_2$, $PhPdX^2L_2$, $PdCl_2(cis, cis-1,5-cyclooctadiene)_2$, $Pd(2,4-pentanedionate)_2$, $PdL_4$, and

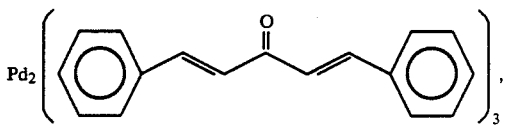

wherein
$X^1$ is Cl, Br, or I,
L is $(R^1)_3P$, and $R^1$ is alkyl or aryl,
$R^2$ is $CH_3$ or phenyl, and
$X^2$ is Br or I.

10. The process of claim 9 wherein said iodoamine is selected from the group consisting of

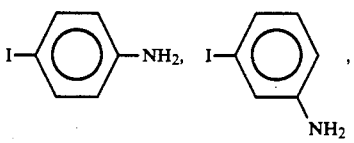

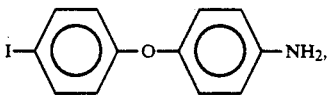

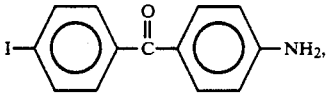

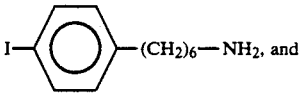

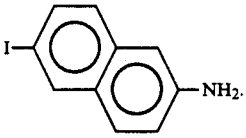

* * * * *